United States Patent
Schlicht et al.

(10) Patent No.: US 11,121,987 B1
(45) Date of Patent: Sep. 14, 2021

(54) CONVERSATIONAL SUPPORT FOR USER JOURNEY

(71) Applicant: Octane AI, Inc., San Francisco, CA (US)

(72) Inventors: Matt Schlicht, Laguna Beach, CA (US); Megan Berry, Portland, OR (US); Benjamin E. Parr, New York, NY (US); Leif K-Brooks, Seattle, WA (US)

(73) Assignee: Octane AI, Inc., San Francisco, CA (US)

( * ) Notice: Subject to any disclaimer, the term of this patent is extended or adjusted under 35 U.S.C. 154(b) by 0 days.

(21) Appl. No.: 17/009,813

(22) Filed: Sep. 2, 2020

Related U.S. Application Data

(60) Provisional application No. 62/895,277, filed on Sep. 3, 2019.

(51) Int. Cl.
*H04L 12/58* (2006.01)
(52) U.S. Cl.
CPC .............. *H04L 51/02* (2013.01); *H04L 51/16* (2013.01)
(58) Field of Classification Search
None
See application file for complete search history.

(56) References Cited

U.S. PATENT DOCUMENTS

| | | | | |
|---|---|---|---|---|
| 9,812,151 | B1* | 11/2017 | Amini | G10L 15/26 |
| 10,601,740 | B1* | 3/2020 | Harding | H04L 51/04 |
| 10,708,216 | B1* | 7/2020 | Rao | G06Q 50/01 |
| 10,757,044 | B2* | 8/2020 | Fawcett | H04L 51/046 |
| 10,904,212 | B1* | 1/2021 | Kaizer | H04L 51/02 |
| 10,951,554 | B1* | 3/2021 | Highman | H04L 51/046 |
| 10,958,599 | B1* | 3/2021 | Penov | G06K 9/6273 |
| 10,992,604 | B1* | 4/2021 | Knas | H04L 51/02 |
| 2006/0129455 | A1* | 6/2006 | Shah | G06Q 30/0267 |
| | | | | 705/14.54 |
| 2007/0055770 | A1* | 3/2007 | Karmakar | H04L 67/26 |
| | | | | 709/224 |
| 2007/0294229 | A1* | 12/2007 | Au | H04M 1/72403 |
| 2008/0189367 | A1* | 8/2008 | Okumura | H04L 51/02 |
| | | | | 709/204 |
| 2012/0041903 | A1* | 2/2012 | Beilby | G06N 20/00 |
| | | | | 706/11 |

(Continued)

*Primary Examiner* — Backhean Tiv
(74) *Attorney, Agent, or Firm* — Muirhead and Saturnelli, LLC

(57) ABSTRACT

Interacting with a user of an electronic device includes presenting information to the user on a screen of the electronic device, a first chatbot that corresponds to the information presented to the user engaging in a conversation with the user based on an agenda that is related to the information presented to the user, the first chatbot recommending an action to the user based at least in part on the conversation and on the agenda, and updating the agenda and presenting new information on the electronic device in response to an action performed by the user. The agenda may be customized for the user based on available information about the user. Information about the user may include information about user behavior, previous actions performed by the user, previous user conversations with chatbots, and/or user personal data. The first chatbot may answer questions by the user about the information.

21 Claims, 5 Drawing Sheets

(56) References Cited

U.S. PATENT DOCUMENTS

| | | | | |
|---|---|---|---|---|
| 2012/0215871 A1* | 8/2012 | Zhang | G06F 16/258 | 709/206 |
| 2014/0047001 A1* | 2/2014 | Phillips | H04L 65/403 | 709/202 |
| 2014/0122056 A1* | 5/2014 | Duan | H04L 51/02 | 704/9 |
| 2014/0122083 A1* | 5/2014 | Xiaojiang | H04L 51/02 | 704/270.1 |
| 2014/0122619 A1* | 5/2014 | Duan | G06F 40/20 | 709/206 |
| 2014/0279050 A1* | 9/2014 | Makar | G06F 16/9535 | 705/14.66 |
| 2014/0337448 A1* | 11/2014 | Kline | H04L 51/063 | 709/206 |
| 2015/0185996 A1* | 7/2015 | Brown | G06F 3/04842 | 715/706 |
| 2016/0099892 A1* | 4/2016 | Palakovich | H04L 51/02 | 709/206 |
| 2016/0125074 A1* | 5/2016 | Chakra | G06Q 30/02 | 707/737 |
| 2016/0352656 A1* | 12/2016 | Galley | G06N 3/0454 | |
| 2016/0360039 A1* | 12/2016 | Sanghavi | H04M 3/5166 | |
| 2017/0148073 A1* | 5/2017 | Nomula | G06Q 30/0617 | |
| 2017/0180284 A1* | 6/2017 | Smullen | H04L 69/14 | |
| 2017/0310613 A1* | 10/2017 | Lalji | H04L 67/20 | |
| 2018/0052664 A1* | 2/2018 | Zhang | G06F 16/90332 | |
| 2018/0096686 A1* | 4/2018 | Borsutsky | H04L 51/02 | |
| 2018/0097753 A1* | 4/2018 | Gill | H04L 51/02 | |
| 2018/0219921 A1* | 8/2018 | Baer | H04L 51/16 | |
| 2018/0322380 A1* | 11/2018 | Aggarwal | G06N 3/006 | |
| 2018/0357309 A1* | 12/2018 | Eidem | H04L 67/20 | |
| 2018/0365212 A1* | 12/2018 | Banerjee | H04L 51/02 | |
| 2018/0367483 A1* | 12/2018 | Rodriguez | H04L 65/60 | |
| 2019/0019077 A1* | 1/2019 | Griffin | G06N 5/041 | |
| 2019/0020605 A1* | 1/2019 | Efrati | G06F 40/30 | |
| 2019/0068527 A1* | 2/2019 | Chen | G06Q 10/00 | |
| 2019/0140986 A1* | 5/2019 | Anderson | H04L 67/104 | |
| 2019/0158433 A1* | 5/2019 | Yun | G06F 3/167 | |
| 2019/0182184 A1* | 6/2019 | Myung | H04L 51/02 | |
| 2019/0182382 A1* | 6/2019 | Mazza | G10L 15/26 | |
| 2019/0188692 A1* | 6/2019 | Humphreys | G06Q 30/0609 | |
| 2019/0199657 A1* | 6/2019 | Fawcett | G06Q 10/1095 | |
| 2019/0199658 A1* | 6/2019 | Kim | G06N 20/00 | |
| 2019/0303218 A1* | 10/2019 | Kantor | G06F 9/485 | |
| 2019/0347326 A1* | 11/2019 | Kozhaya | G06F 40/35 | |
| 2019/0392285 A1* | 12/2019 | Manaharlal Kakkad | G06F 40/30 | |
| 2020/0082928 A1* | 3/2020 | Wu | G16H 80/00 | |
| 2020/0097221 A1* | 3/2020 | Matsumoto | H04L 51/32 | |
| 2020/0125678 A1* | 4/2020 | Conley | H04L 51/02 | |
| 2020/0142719 A1* | 5/2020 | Akbulut | G06F 16/3329 | |
| 2020/0143797 A1* | 5/2020 | Manoharan | G10L 15/16 | |
| 2020/0150839 A1* | 5/2020 | Roisman | H04L 51/02 | |
| 2020/0342874 A1* | 10/2020 | Teserra | G06F 40/284 | |
| 2020/0382447 A1* | 12/2020 | Huang | G06F 16/289 | |
| 2020/0394724 A1* | 12/2020 | Agrawal | G06F 16/35 | |
| 2020/0403944 A1* | 12/2020 | Joshi | G06F 9/547 | |
| 2021/0029065 A1* | 1/2021 | Erhart | H04L 51/02 | |
| 2021/0057095 A1* | 2/2021 | Dunstan | G16H 10/20 | |
| 2021/0083993 A1* | 3/2021 | Highman | G06Q 30/0641 | |

* cited by examiner

CONVERSATIONAL SUPPORT FOR USER JOURNEY

CROSS-REFERENCE TO RELATED APPLICATIONS

This application claims priority to U.S. Prov. App. No. 62/895,277, filed on Sep. 3, 2019, and entitled "CONVERSATIONAL SUPPORT FOR USER JOURNEY", which is incorporated herein by reference.

TECHNICAL FIELD

This application is directed to the field of information processing using automatic conversational entities, or chatbots, and more particularly to design and functioning of chatbot systems assisting and directing users through multi-platform user journeys across web sites, applications, online, and offline activities.

BACKGROUND OF THE INVENTION

Since the introduction of user journeys by Oxford[SM] in 1998, customer journeys have become a key component of user interface design and customer experience research. Recent studies point out that the customer journey analytics market will grow in 2019-2025 at a CAGR of 21.6 percent and will exceed 20 billion dollars by 2025. Key market vendors include IBM, SAP, Salesforce, Adobe, NICE Systems, Verint, Pointillist and others. Among multiple verticals, such as Banking, Financial Services and Insurance (BFSI), retail, telecom, travel and hospitality, healthcare, government and other areas, retail is expected to show the highest growth rate of customer journey analytics, resulting in higher profitability, improved customer experiences and increased brand loyalty.

Large online retailers are already enjoying significant benefits of customer journey mapping (CJM) implementations. For example, Amazon's product recommendation engine is incorporating fragments of customer journeys based on customer browsing and purchase history and on collaborative, content-based and hybrid filtering. The Amazon recommendation engine offers additional touchpoints along the user journey, such as the accompanying lists of frequently bought together or additionally purchased items, discounted bundles, email recommendations, etc. By some estimates, the Amazon product recommendation engine generates 35 percent of Amazon's revenue.

At the core of a user journey lies a dynamic multi-stage interaction of a persona (a user model) with an ecommerce, educational, financial, healthcare or other system through a series of touchpoints, which may include online and offline, electronic and physical components. Each persona may have different reactions to the same touchpoint and may call, on the one hand, for interpretations and explanations of various system parameters and available actions, and on the other hand, for personalization of user experiences based on various characteristics and past experiences of the customer.

Personalization of user journeys represents a dominant trend in ecommerce, education, financial services and other areas. According to market research, the amounts consumers spend in ecommerce may increase by 48 percent when their experiences are personalized, while 57 percent of online shoppers feel comfortable with providing personal information to a brand, as long as it directly benefits their shopping experience. At the same time, only 22 percent of shoppers are satisfied with the existing level or personalization.

Achieving high levels of personalization through user journeys is a difficult task. There are many categories of users differing by demographics, education, interests, income, purchasing behavior, temperament, risk tolerance and other characteristics; satisfying personalization requests of users requires the implementation of very different features of touchpoints and is accompanied by addressing multiple pain points. Additionally, personalization of customer journeys for first time users may be impeded by the mere lack of user information. Therefore, personalization of user experiences and journeys can be approached as an interactive process where a system gradually obtains information about the user and monitors user behavior to obtain additional information about the user that may be used in a subsequent session, while a user should be able to receive explanations at any touchpoint and beyond.

Artificial conversational entities, or chatbots, have proven their usefulness for many aspects of user interaction with online systems. Recent studies have shown that 34 percent of retail shoppers and 27 percent of users of online healthcare services would be comfortable receiving answers from AI-powered assistants. Some analysts consider comprehensive chatbot usage as a new trend in ecommerce. However, chatbot assistance in user journeys is still sporadic and lacks support for many important situations in user journeys, such as a temporary or long-term user suspension of a journey.

Accordingly, it is desirable to create a mechanism and system for a comprehensive and seamless conversational support of user journeys employing chatbots.

SUMMARY OF THE INVENTION

According to the system described herein, interacting with a user of an electronic device includes presenting information to the user on a screen of the electronic device, a first chatbot that corresponds to the information presented to the user engaging in a conversation with the user based on an agenda that is related to the information presented to the user, the first chatbot recommending an action to the user based at least in part on the conversation and on the agenda, and updating the agenda and presenting new information on the electronic device in response to an action performed by the user. The agenda may be customized for the user based on available information about the user. Information about the user may include information about user behavior, previous actions performed by the user, previous user conversations with chatbots, and/or user personal data. The first chatbot may answer questions by the user about the information. There may be goals associated with the information and the agenda may be based on the goals. The goals may include product purchase, subscription to a website, subscription to a service, subscription to a newsletter, and/or writing a product review. The first chatbot may purposefully direct the conversation to motivate the user to accomplish the goals. The user may perform the action recommended by the first chatbot or may perform an action that is different from the action recommended by the first chatbot. A second chatbot that corresponds to the new information presented to the user may engage in a new conversation with the user based on the updated agenda, the second chatbot being different from the first chatbot. The action recommended by the first chatbot may be designed to cause the user to engage with the second chatbot. The electronic device may be a mobile device. The conversation with the chatbot may be provided through one of a plurality of conversational venues based on available conversational options for the user. The conversional venues may include a messaging application, SMS communication, Web page based conversation, or a conversation using the electronic device. The user may suspend the conversation with the first chatbot. In response to suspending the conversation with the first chatbot, the agenda may be modified to include reminders for the user to resume the conversation. The user may resume the suspended conversation and select an action. The information presented to the user may be an advertising snippet or an educational snippet.

According further to the system described herein, non-transitory computer readable media contains software that interacts with a user of an electronic device. The software includes executable code that presents information to the user on a screen of the electronic device, executable code that causes a first chatbot that corresponds to the information presented to the user to engage in a conversation with the user based on an agenda that is related to the information presented to the user, executable code that causes the first chatbot to recommend an action to the user based at least in part on the conversation and on the agenda, and executable code that updates the agenda and presents new information on the electronic device in response to an action performed by the user. The agenda may be customized for the user based on available information about the user. Information about the user may include information about user behavior, previous actions performed by the user, previous user conversations with chatbots, and/or user personal data. The first chatbot may answer questions by the user about the information. There may be goals associated with the information and the agenda may be based on the goals. The goals may include product purchase, subscription to a website, subscription to a service, subscription to a newsletter, and/or writing a product review. The first chatbot may purposefully direct the conversation to motivate the user to accomplish the goals. The user may perform the action recommended by the first chatbot or may perform an action that is different from the action recommended by the first chatbot. A second chatbot that corresponds to the new information presented to the user may engage in a new conversation with the user based on the updated agenda, the second chatbot being different from the first chatbot. The action recommended by the first chatbot may be designed to cause the user to engage with the second chatbot. The electronic device may be a mobile device. The conversation with the chatbot may be provided through one of a plurality of conversational venues based on available conversational options for the user. The conversional venues may include a messaging application, SMS communication, Web page based conversation, or a conversation using the electronic device. The user may suspend the conversation with the first chatbot. In response to suspending the conversation with the first chatbot, the agenda may be modified to include reminders for the user to resume the conversation. The user may resume the suspended conversation and select an action. The information presented to the user may be an advertising snippet or an educational snippet.

The proposed system offers an agenda driven conversational support of a user journey, whereby a dynamically updated agenda reflects goals of an ecommerce, educational, financial or other system or service, including online, device bound or combined implementations; the proposed system employs chatbots at multiple touchpoints as a means of user assistance and propagation of a user journey. Chatbots may answer user questions, provide instructions, collect user data, offer alternative stages and paths through a user journey and handle deferred stages of a user journey, such as a temporary suspension or abandonment of a journey, by automatically scheduling follow-up and reminder activities for a user.

Various aspects of system functioning and workflow are explained as follows.

Online and offline pages and application screens, informational, instructional and advertising snippets and other user accessible components and touchpoints of a user journey through an ecommerce, educational, financial or other system or service (collectively, touchpoints) are enhanced with three items:

1. Agenda, representing a set of goals the touchpoint is serving. For example, a text, display or interstitial advertising may serve the goals of driving a user to purchase a product and pay for it, add the product to a wish list or a shopping basket, explore a product page, visit a product catalog or leave user contact information to receive product news or notifications. For example, a snippet of an educational system may display an interesting natural or scientific phenomenon and aim at driving a user through exploration steps and ultimately learn more about the phenomenon or acquire basic/additional knowledge in a certain area.
2. Actions, available to a user interacting with a touchpoint. For example, a display ad may allow a click-through to a target page, filling in a simple form or leaving an email address or choosing an option from a list, while a product catalog page may additionally allow filtering items by categories, sorting the items by price or user ratings, customizing a product, etc.
3. Chatbot (Artificial Conversational Entity), associated with a touchpoint, providing conversational support to a user and fulfilling multiple functions, such as:
   (i) Answering user questions on the meaning, purpose, appearance and features of a touchpoint.
   (ii) Purposefully directing a conversation to motivate a user to accomplish as many of the agenda goals as possible.
   (iii) In order to fulfill the agenda goals, a chatbot may propagate a user journey directing the user to various subsequent stages of the journey depending on the conversation flow and available information about the user, such as user behavior, previous actions performed by the user, previous user conversations with chatbots, and user personal data and offering feasible actions (see #2 above). For example, a chatbot associated with an advertising snippet may alternatively direct a user to a shopping cart, to a filtering or sorting page in a product catalog or to a product customization page. Users may skip some of the recommended actions and subsequent stages and continue the conversation until they choose a desired action; alternatively, users may suspend or abandon the conversation.
   (iv) Accessing available information about the user based on past user journeys and collecting additional user data for subscriptions, notifications, product preferences, purchasing, navigational and other behavior, etc.
   (v) Modifying the agenda based on conversation with the user and on a user choice of the next stage. A modified agenda is transferred to the system to inform the next stage of the user journey and the associated chatbot.
   (vi) Processing results of a suspended or abandoned conversation, including storing the current status of user journey and conversation, preparing, scheduling and delivering reminders, etc.

Conversational support may be provided through different venues, for example:

An online touchpoint may have a built-in conversational interface, including a Q&A panel and a text field for user entries.

A user may be instantly redirected to a conventional messaging application, such as Facebook Messenger, and start or continue a conversation in a desktop, mobile or web-based application.

A conversation may proceed in a built-in or installed SMS application on a smartphone or tablet of a user.

In some cases, the system may detect available conversational/messaging options for a user—for example, identifying a Facebook account of the user or a mobile device used to access a touchpoint. Accordingly, the system may offer a user a choice of venue to conduct conversations with chatbots.

A system workflow with conversational support of user journeys may include the following:

A. A user encounters a touchpoint of a new or continuing journey, finds out that the touchpoint has conversational support and initiates a conversation with an associated chatbot.

B. The chatbot compares the agenda with available information about the user and defines a conversation path aiming at the most desired user actions and, at the same time, answering user questions and collecting, where possible, additional user data and preferences.

C. The chatbot offers a choice of user actions, such as purchasing a product, exploring a product space, customizing a product, signing up for product updates, learning facts associated with an educational snippet, setting up an online banking service or payee list, etc. The chatbot attempts to maximize the value of interaction with the user related to the current touchpoint. If the user is not ready to take recommended actions, the chatbot offers alternative actions.

D. Once the user has chosen an action and moved to a next stage of the user journey and to a next touchpoint, the system stores the conversation and the chosen action and modifies the agenda marking the accomplished goal and rebuilding the targets for the next step.

Steps A-D may continue until the user either accomplishes a desired system goal, for example, Purchasing a product and signing up for product updates.

Completing learning path for an educational project and successfully passing a final quiz.

Setting up an online banking account and an associated payment center or until the user abandons some stage of the user journey (possibly fulfilling intermediate goals) by suspending a conversation with a chatbot associated with a certain touchpoint or by leaving the system without switching to a next recommended touchpoint.

E. A chatbot processes a suspended conversation and may send the user a status report reflecting the journey taken to the point of interruption and the desired next step. The system stores the suspended user status and may schedule a follow-up in the form of reminder. The chatbot that processed the suspended interaction with the user (or another system component) may fulfill the follow-up schedule sending the user reminder(s), which the user may pursue, ignore or cancel further reminders.

BRIEF DESCRIPTION OF THE DRAWINGS

Embodiments of the system described herein will now be explained in more detail in accordance with the figures of the drawings, which are briefly described as follows.

DETAILED DESCRIPTION OF VARIOUS EMBODIMENTS

The system described herein provides a mechanism for conversational support of a user journey driven by a system supported and dynamically updated agenda, which reflects goals of a user journey, fulfilled by chatbots employed at multiple touchpoints as the means of user assistance and propagation of a user journey.

Figure 1A:
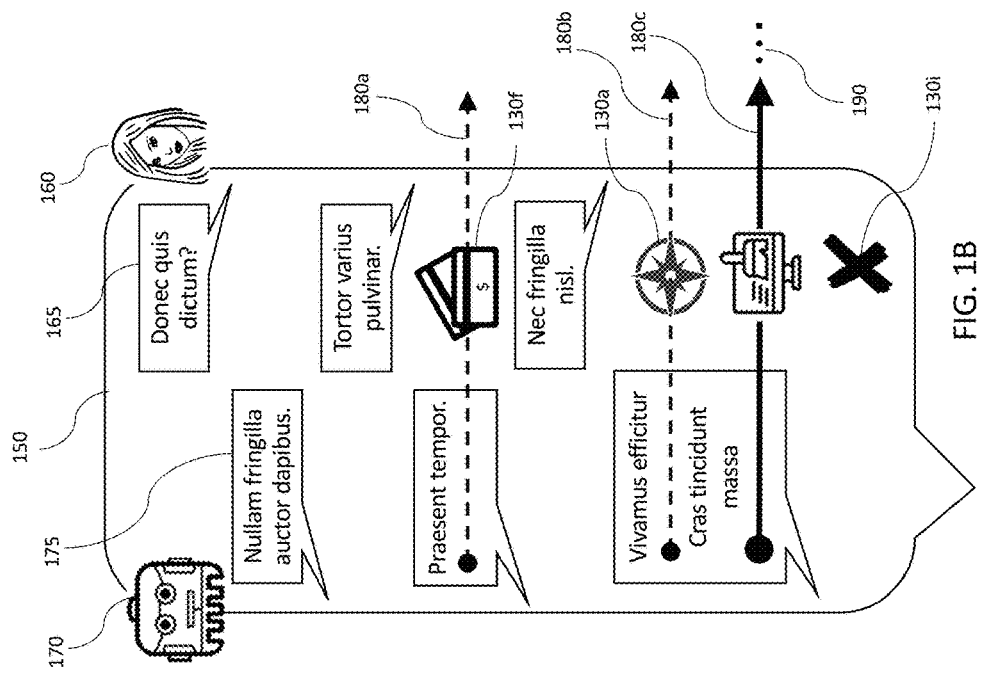
FIGS. 1A and 1B are schematic illustrations of system components and a principal workflow, according to an embodiment of the system described herein.

FIG. 1A is a schematic illustration of system components and a portion of principal workflow. A web page or a mobile/desktop application screen 110 includes two touchpoints: a product offering 115 (a fragment of a product catalog) with a conversational support via a chatbot 117 (Artificial Conversational Entity) and a conversational ad 120 (conversation-enabled snippet), supported by a chatbot 125. Each of the touchpoints 115, 120 may offer a user a broad set of actions 130, explained and recommended during conversations with the appropriate chatbots, such as navigation 130a, filtering 130b, sorting 130c, customization 130d, adding products and/or services to a shopping basket 130e, payments 130f, sharing 130g, emailing 130h, terminating, abandoning, canceling or suspending actions, journey or conversations 130i, etc.

When a user activates a conversation associated with a touchpoint of a user journey, a corresponding one of the chatbots 117, 125 obtains from the system an agenda 140 that may be customized for a particular user based on available information about the user; the agenda 140 reflects system goals and may accompany the whole journey, leading a user step-by-step through items of the agenda 140, as illustrated by an agenda graph 145; a user may perform a corresponding one of the actions 130, following recommendations by chatbots at various touchpoints or may deviate from the recommendations by the chatbots. Examples of agenda goals, potentially achieved through multiple steps of a user conversation with one or different chatbots and at single or multiple touchpoints, may include product purchase, subscription to a website, service or newsletter, resuming an abandoned journey or writing a product review.

Figure 1B:
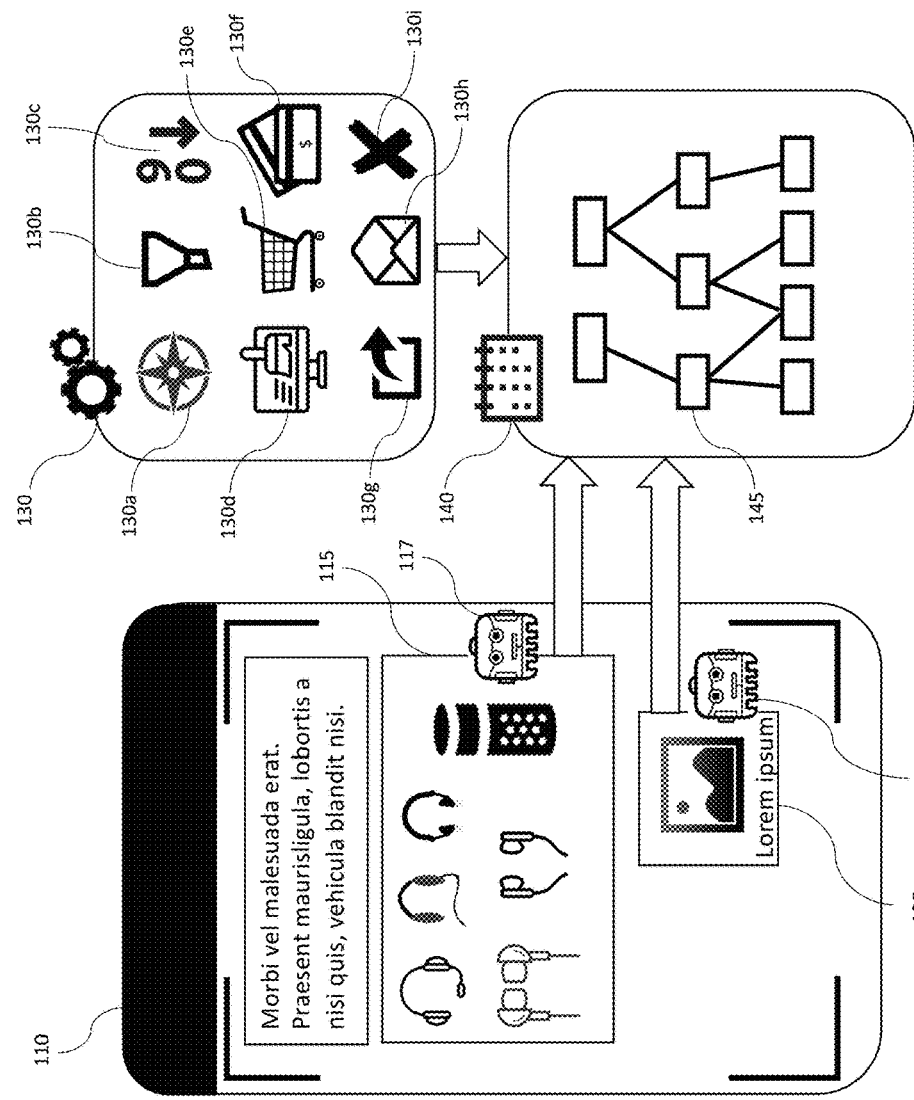

As shown in FIG. 1B, illustrating the second portion of principal workflow, after the system supplies a chatbot with an original or updated agenda, a conversation 150 between a user 160 and a chatbot 170 may begin. The user 160 may ask questions 165, to which the chatbot 170 may post replies 175. Further down the stream of the conversation 150, the chatbot 170 may move through the agenda graph 145 (shown in FIG. 1A) and make recommendations to the user 160, such as a recommendation 180a to make the payment 130f (for goods, services, etc.), a recommendation 180b to proceed with the navigation 130a of websites, application screens or visiting other touchpoints along the user journey or a recommendation 180c to customize certain items or experiences for the user journey. In the conversation 150, the user 160 skips the recommendations 180a, 180b, which extends the conversation, and accepts the recommendation 180c, which transfers the user to a next step 190 of the user journey, while the current conversation 150 terminates, as indicated by the terminating conversation 130i at the bottom of the window for the conversation 150. Note that, even if the user 160 does not accept the recommendation 180c, the user 160 is free to terminate or suspend the conversation 150 at any time.

Figure 2:
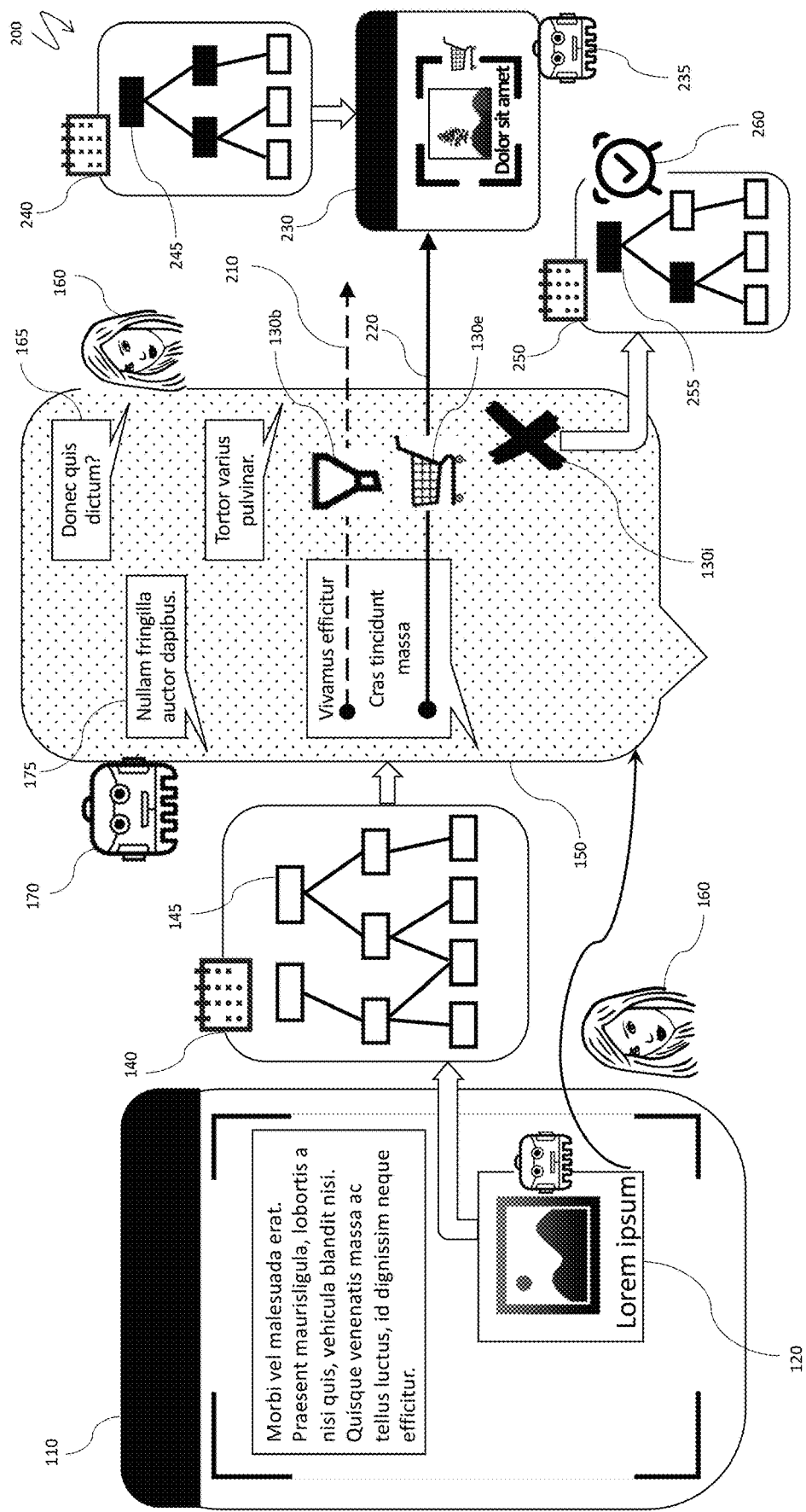
FIG. 2 is a schematic illustration of two stages of a user journey with a modified agenda, according to an embodiment of the system described herein.

FIG. 2 is a schematic illustration 200 of two stages of a user journey with a modified agenda. Here, the user 160 encounters a touchpoint in the form of the conversational ad 120 on the web page or application screen 110 and initiates the conversation 150 of the user 160 with the chatbot 170, driven by the agenda 140, represented by the agenda graph 145. Similar to FIG. 1A and FIG. 1B, the user 160 and the chatbot 170 exchange the sequence of questions 165 and answers 175; then the chatbot 170 posts a recommendation 210 (the filtering 130b), which the user 160 rejects. The rest of FIG. 2 shows two options for continuation of the user journey:

(a) The chatbot 170 makes a recommendations 220, suggesting to choose a product for placement in the shopping basket 130e. The user 160 accepts the recommendation 220. Subsequently, the user 160 moves to a next step of the user journey, represented by a touchpoint 230—a web page or application screen with the shopping basket 130e (as indicated by the recommendation 220); the shopping basket 130e is conversation enabled and supplied with a chatbot 235. A modified chatbot agenda 240 has an agenda graph 245, where fulfilled steps of the original agenda 140 are shown as solid black rectangles.

(b) Alternatively, the user 160 may reject the recommendation 220 and suspend the conversation 150. The system may create a deferred agenda 250 with an agenda graph 255 and a reminder (or a set of reminders) 260 that may alert the user 160 about the unfinished conversation at a future time.

Figure 3:
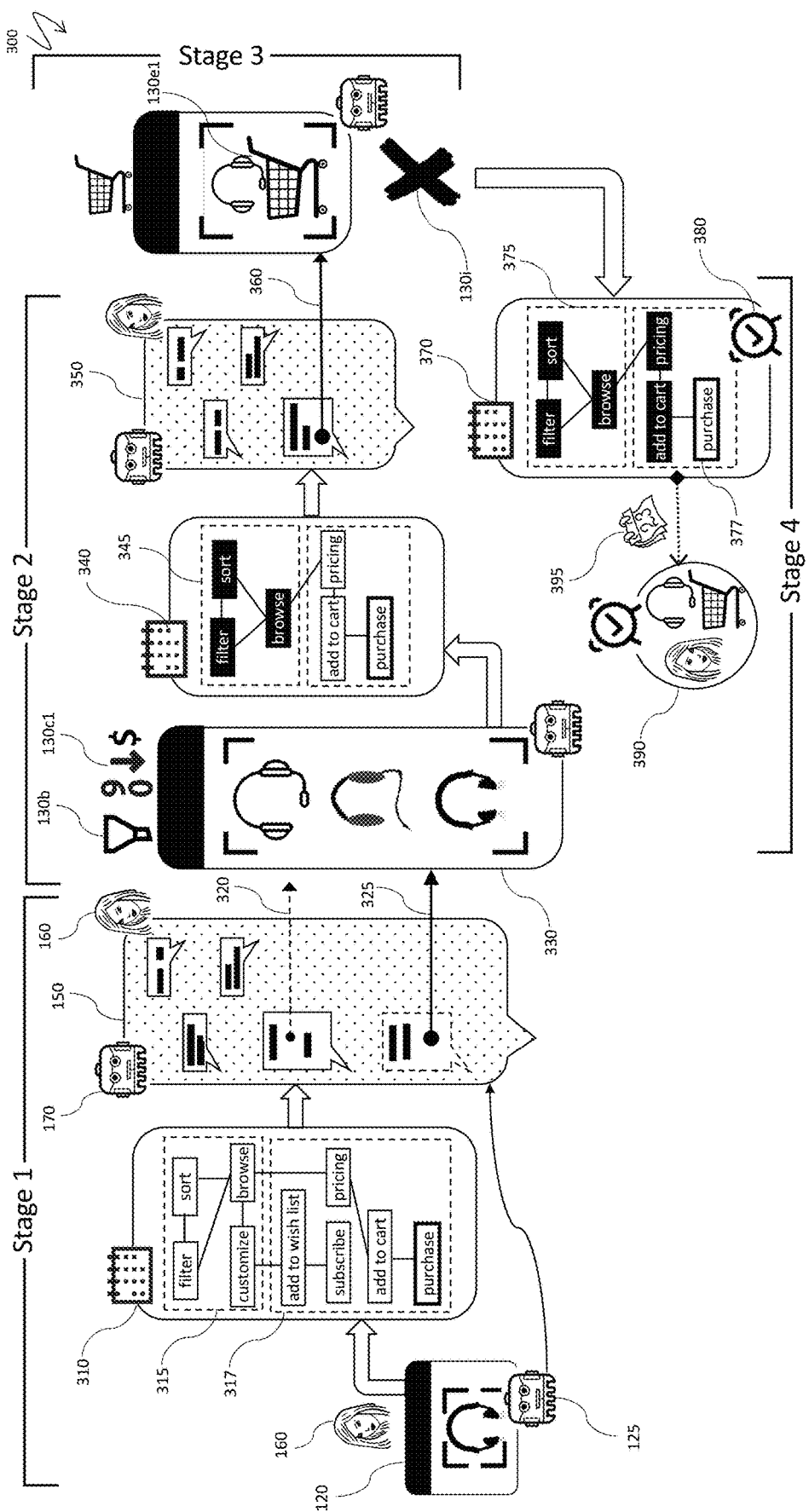
FIG. 3 is a schematic illustration of a multistage conversation-enabled user journey, according to an embodiment of the system described herein.

FIG. 3 is a schematic illustration 300 of a multistage conversation-enabled user journey. The journey starts when the user 160 activates a conversation-enabled touchpoint corresponding to the conversational ad 120, supported by the chatbot 125. In response, the system provides the chatbot 125 with an agenda 310; an agenda graph includes two layers: a product exploration layer 315 with filtering, sorting, browsing and customizing product offerings, and a product purchase layer 317 with a wish list, subscription to product news, studying pricing information, adding product to shopping basket (cart) and completing a purchase. The agenda 310 drives the conversation 150 between the user 160 and the chatbot 170, as explained elsewhere herein (see, for example, FIGS. 1, 2 and the accompanying text). At some point in the conversation 150, the chatbot 170 posts a recommendation 320, which the user 160 rejects, and another recommendation 325, which the user 160 accepts.

Following the recommendation 325, the user 160 moves from Stage 1 to Stage 2 of the user journey, where the user 160 is exploring a product catalog by filtering and sorting by price its entries, as shown by the filtering 130b and by sorting 130c1, and browsing the catalog. User actions performed at Stage 2 cause modifications to the journey agenda. An updated agenda 340 has a different agenda graph 345 with filled items that show fulfilled steps of the agenda 340. The rest of conversations between the user 160 and the chatbots supporting new touchpoints along the user journey are driven by unfulfilled items, forming the modified agenda 340. Thus, the agenda 340 informs a next conversation 350, analogous to other conversation sessions, explained in FIG. 1A, FIG. 1B and FIG. 2. At the end of the conversation 350, the user 160 makes a choice 360, which moves the user 160 to the Stage 3, where the user 160 places a chosen product into a shopping cart 130e1.

Had the user 160 purchased the product at Stage 3, the initial agenda 310 would have been completed. However, under the scenario illustrated by FIG. 3, the user 160 defers the purchase and suspends the user journey, as shown by the suspension (cancellation, abandonment) action 130i. However, in contrast with many traditional user journey support systems, the proposed system moves to Stage 4 (without an explicit user participation), where the agenda is modified again, and an agenda graph 375 of an updated agenda 370 includes a single item, a purchase step 377. Additionally, since the user 160 has suspended the current journey, the agenda acquires an additional reminder feature 380, which schedules a user alert 390, reminding the user 160 at a date and time 395, about the product presence in the shopping cart 130e1.

Figure 4:
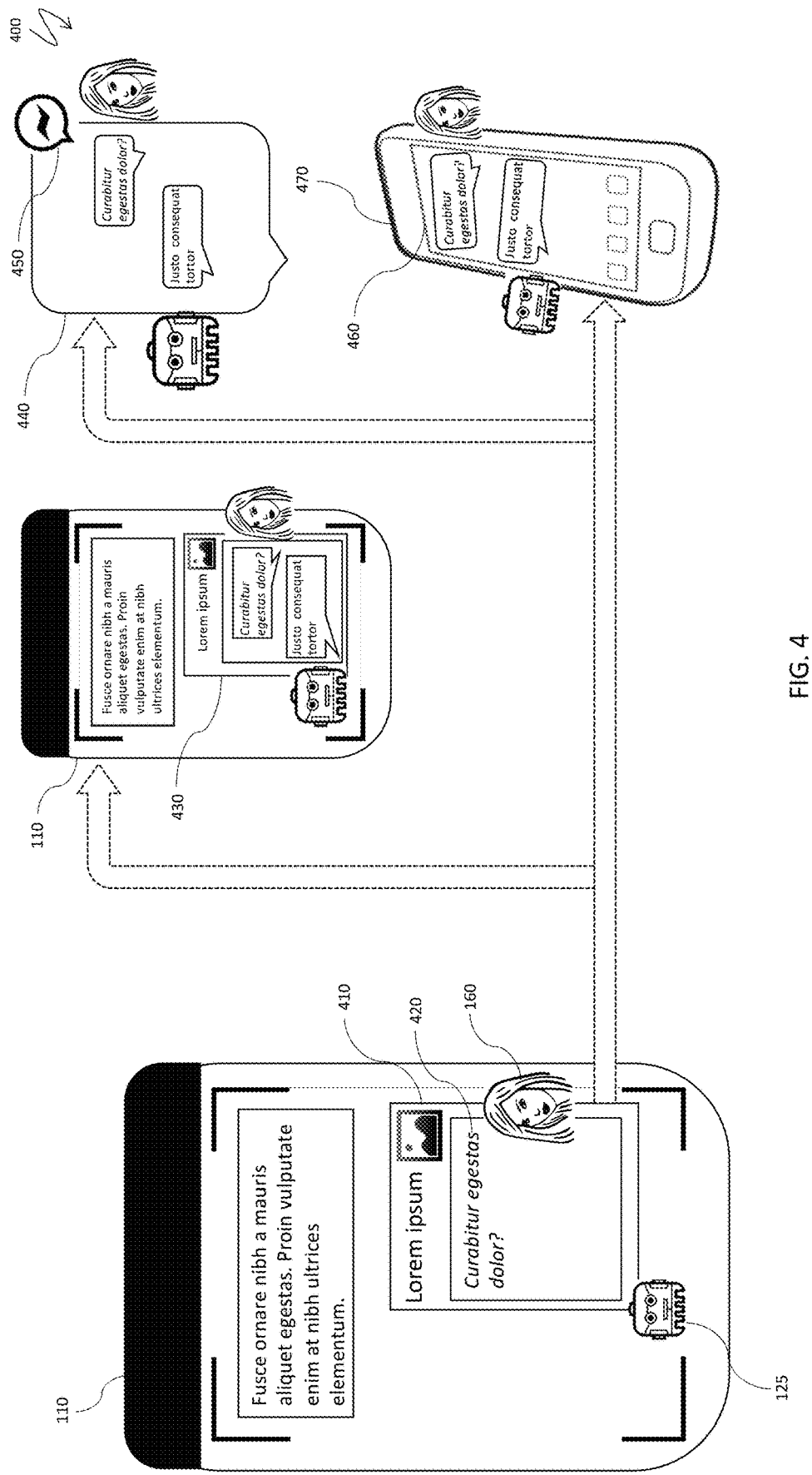
FIG. 4 is a schematic illustration of alternative conversational venues, according to an embodiment of the system described herein.

FIG. 4 is a schematic illustration 400 of the alternative conversational venues. Analogously to FIGS. 1A, 1B, 2, and 3, the user 160 starts a user journey by interacting with a conversation-enabled touchpoint 410 on the website or application screen 110; the conversation is supported by the chatbot 125. The conversation-enabled touchpoint 410 (conversational ad) has an entry field where the user 160 may initiate a conversation by posting a first question 420, may enter requested data, choose an option of continuing the journey, etc. The rest of the conversation at the touchpoint 410 may continue through different conversational venues:

The conversation may proceed within a same entry field 430, which becomes a fully functional conversational window.

The conversation may be moved by the system to a conversation 440 within a messaging application, such as Facebook Messenger 450, running on a mobile or desktop device.

The conversation may continue as a texting (SMS or other) conversation 460 on a smartphone 470 or another mobile device.

The choice of a conversational venue may be made by the user 160 or by a system based on the known information about the user, the history of user interactions with the system, the entered question 420, etc.

Figure 5:
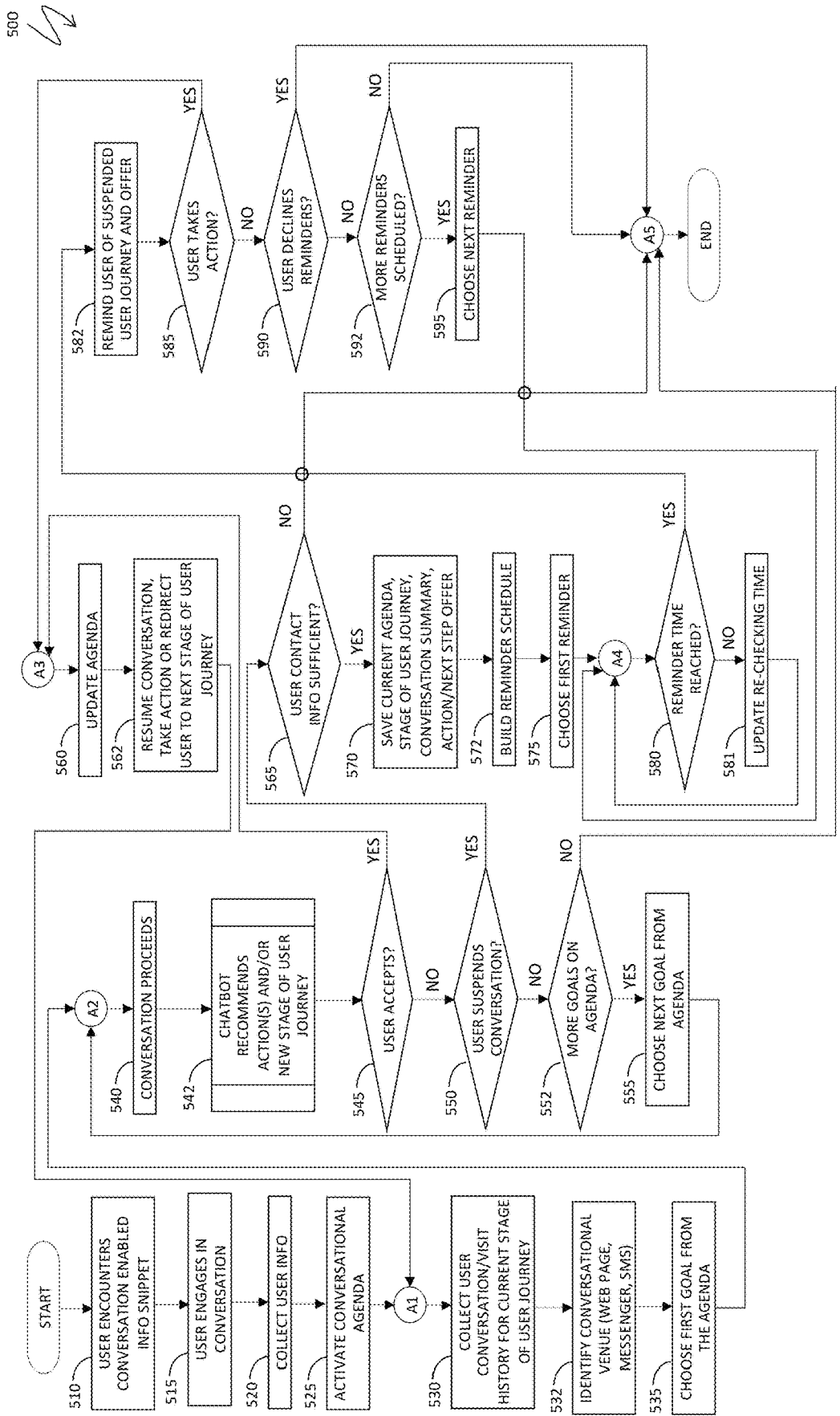
FIG. 5 is a system flow diagram illustrating system functioning in connection with conversational support of a user journey, according to an embodiment of the system described herein.

Referring to FIG. 5, a system flow diagram 500 illustrates system functioning in connection with conversational support of user journeys. Processing begins at a step 510, where a user encounters a conversation enabled info snippet at the start of a user journey. After the step 510, processing proceeds to a step 515, where the user engages in a conversation. After the step 515, processing proceeds to a step 520, where the system collects information about the user. After the step 520, processing proceeds to a step 525, where the system builds and activates a conversational agenda based, in part, on the information about the user, as explained elsewhere herein (see, for example, FIGS. 1A, 1B, 2, and 3 and the accompanying text).

After the step 525, processing proceeds to a step 530, where the system collects conversational and visit history of the user for the current stage of the user journey, which may or may not be available (for example, in case of a new user).

After the step 530, processing proceeds to a step 532, where the system identifies a conversational venue for the current conversation, as explained in FIG. 4 and the accompanying text. After the step 532, processing proceeds to a step 535, where the chatbot chooses a first goal from the agenda. After the step 535, processing proceeds to a step 540, where the conversation continues. After the step 540, processing proceeds to a step 542, where the chatbot recommends that the user undertake certain actions, including moving to a next stage of a user journey (next touchpoint), as explained elsewhere herein (see, in particular, FIG. 1A and FIG. 1B for the list of actions and examples of recommendations, and FIG. 3 for a multi-stage user journey). After the step 542, processing proceeds to a test step 545, where it is determined whether the user accepts chatbot recommendations. If not, processing proceeds to a test step 550, where it is determined whether the user suspends the current conversation, as explained elsewhere herein (see FIG. 3 and the accompanying text related to Stage 3 of the user journey). If not, processing proceeds to a test step 550, where it is determined whether the user suspends the current conversation. If not, processing proceeds to a test step 552, where it is determined whether there are more goals on the agenda. If not, processing is complete; otherwise, processing proceeds to a step 555, where a next goal is chosen from the agenda for driving the chatbot functioning, as explained elsewhere herein. After the step 555, processing proceeds to a step 540, which may be independently reached from the step 535.

If it was determined at the test step 550 that the user suspends the current conversation, processing proceeds to a test step 565, where it is determined whether the system has sufficient user contact information for the subsequent steps. If not, processing is complete; otherwise, processing proceeds to a step 570, where the system saves a current state of the agenda, a stage of the user journey, a conversation summary and a current action or next step recommended by the chatbot to the user (if any). After the step 570, processing proceeds to a step 572, where the system builds a reminder schedule. After the step 572, processing proceeds to a step 575, where the first reminder is chosen. After the step 575, processing proceeds to a test step 580, where it is determined whether the reminder time has been reached. If not, processing proceeds to a step 581, where re-checking time is updated. After the step 581, processing proceeds back to the test step 580 for another check (note that the step 580 may be independently reached from the step 575). If it was determined at the test step 580 that the reminder time has been reached, processing proceeds to a step 582, where the user is reminded about the suspended user journey, conversation and recommended actions/steps (if any). After the step 582, processing proceeds to a test step 585, where it is determined whether the user takes action after receiving a reminder. If so, processing proceeds to a step 560 where the agenda of the user journey is updated. After the step 560, processing proceeds to a step 562, where the user resumes the previously suspended conversation, takes a recommended action or is redirected to a next step of the user journey. After the step 562, processing proceeds to the step 530, which may be independently reached from the step 525.

If it was determined at the test step 585 that the user does not take an action following the receipt of a reminder, processing proceeds to a test step 590, where it is determined whether the user declines the reminders altogether. If so, processing is complete; otherwise, processing proceeds to a test step 592, where it is determined whether there are more scheduled reminders. If not, processing is complete; otherwise, processing proceeds to a step 595, where a next scheduled reminder is chosen. After the step 595, processing proceeds to the test step 580, which may be independently reached from the steps 575, 581. If it was determined at the test step 545 that the user accepts a recommendation posted by a chatbot, processing proceeds to the step 560, which may be independently reached from the test step 585.

Various embodiments discussed herein may be combined with each other in appropriate combinations in connection with the system described herein. Additionally, in some instances, the order of steps in the flowcharts, flow diagrams and/or described flow processing may be modified, where appropriate. Subsequently, system configurations and functions may vary from the illustrations presented herein. Further, various aspects of the system described herein may be implemented using various applications and may be deployed on various devices, including, but not limited to smartphones, tablets and other mobile computers. Smartphones and tablets may use operating system(s) selected from the group consisting of: iOS, Android OS, Windows Phone OS, Blackberry OS and mobile versions of Linux OS. Mobile computers and tablets may use operating system selected from the group consisting of Mac OS, Windows OS, Linux OS, Chrome OS. Interactive web pages may be built using various web programming languages and development environments, such as JavaScript and its variants, PHP, Python, Ruby on Rails, HTML5/CSS3, Java, ASP.NET, and C#.

Software implementations of the system described herein may include executable code that is stored in a computer readable medium and executed by one or more processors. The computer readable medium may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. The software may be bundled (pre-loaded), installed from an app store or downloaded from a location of a network operator. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of interacting with a user of an electronic device, comprising:
   presenting information to the user on a screen of the electronic device;
   a first chatbot that corresponds to the information presented to the user engaging in a conversation with the user based on an agenda that is related to the information presented to the user, the agenda being represented by an agenda graph having interconnected nodes containing goals associated with the information;
   the first chatbot recommending at least one of a plurality of recommended actions to the user based at least in part on the conversation and on a first goal associated with a corresponding current node of the agenda graph; and
   updating the agenda by traversing to a new node of the agenda graph and presenting new information on the electronic device in response to a performed action performed by the user, wherein the new information corresponds to a second goal associated with the new node of the agenda graph.

2. The method, according to claim 1, wherein the agenda is customized for the user based on available information about the user.

3. The method, according to claim 2, wherein information about the user includes information about at least one of: user behavior, previous actions performed by the user, previous user conversations with chatbots, and user personal data.

4. The method, according to claim 1, wherein the first chatbot answers questions by the user about the information.

5. The method, according to claim 1, wherein the goals include at least one of: product purchase, subscription to a website, subscription to a service, subscription to a newsletter, or writing a product review.

6. The method, according to claim 1, wherein the first chatbot purposefully directs the conversation to motivate the user to accomplish the first goal.

7. The method, according to claim 1, wherein the user performs at least one of the plurality of recommended actions recommended by the first chatbot.

8. The method, according to claim 1, wherein the user performs an action that is different from at least one of a plurality of recommended actions recommended by the first chatbot.

9. The method, according to claim 1, wherein a second chatbot that corresponds to the new information presented to the user engages in a new conversation with the user based on the updated agenda, the second chatbot being different from the first chatbot.

10. The method, according to claim 9, wherein the action recommended by the first chatbot is designed to cause the user to engage with the second chatbot.

11. The method, according to claim 1, wherein the electronic device is a mobile device.

12. The method, according to claim 1, wherein the conversation with the first chatbot is provided through one of a plurality of conversational venues based on available conversational options for the user.

13. The method, according to claim 12, wherein the conversional venues include: a messaging application, SMS communication, Web page based conversation, or a conversation using the electronic device.

14. The method, according to claim 1, wherein the user suspends the conversation with the first chatbot.

15. The method, according to claim 14, wherein in response to suspending the conversation with the first chatbot, the agenda is modified to include reminders for the user to resume the conversation.

16. The method, according to claim 15, wherein the user resumes the suspended conversation and selects an action in response to at least one of the reminders.

17. The method, according to claim 1, wherein the information presented to the user is one of: an advertising snippet or an educational snippet.

18. The method, according to claim 1, wherein the agenda graph is modified by removing a node corresponding to the first goal prior to presenting the new information.

19. Non-transitory computer readable media containing software that interacts with a user of an electronic device, the software comprising:
   executable code that presents information to the user on a screen of the electronic device;
   executable code that causes a first chatbot that corresponds to the information presented to the user to engage in a conversation with the user based on an agenda that is related to the information presented to the user, the agenda being represented by an agenda graph having interconnected nodes containing goals associated with the information;
   executable code that causes the first chatbot to recommend at least one of a plurality of recommended actions to the user based at least in part on the conversation and on a first goal associated with a corresponding current node of the agenda graph; and
   executable code that updates the agenda by traversing to a new node of the agenda graph and presents new information on the electronic device in response to a performed action performed by the user, wherein the new information corresponds to a second goal associated with the new node of the agenda graph.

20. The non-transitory computer readable media, according to claim 19, wherein a second chatbot that corresponds to the new information presented to the user engages in a new conversation with the user based on the updated agenda, the second chatbot being different from the first chatbot.

21. The non-transitory computer readable media, according to claim 19, wherein the agenda graph is modified by removing a node corresponding to the first goal prior to presenting the new information.

* * * * *